US009875860B2

(12) United States Patent
Malapelle et al.

(10) Patent No.: US 9,875,860 B2
(45) Date of Patent: Jan. 23, 2018

(54) FIBER OPTIC RING FOR BYPASS SYSTEM IN MULTI-CELL POWER SUPPLY

(71) Applicants: Paolo Malapelle, Monroeville, PA (US); Vance McMichael, New Kensington, PA (US); Peter Hammond, Greensburg, PA (US)

(72) Inventors: Paolo Malapelle, Monroeville, PA (US); Vance McMichael, New Kensington, PA (US); Peter Hammond, Greensburg, PA (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 77 days.

(21) Appl. No.: 15/028,952

(22) PCT Filed: Sep. 18, 2013

(86) PCT No.: PCT/US2013/060288
§ 371 (c)(1),
(2) Date: Apr. 13, 2016

(87) PCT Pub. No.: WO2015/041638
PCT Pub. Date: Mar. 26, 2015

(65) Prior Publication Data
US 2016/0247641 A1  Aug. 25, 2016

(51) Int. Cl.
*H01H 9/54* (2006.01)
*H02M 1/32* (2007.01)
(Continued)

(52) U.S. Cl.
CPC ............... *H01H 9/54* (2013.01); *H02J 3/46* (2013.01); *H02M 1/32* (2013.01); *H02M 5/458* (2013.01);
(Continued)

(58) Field of Classification Search
CPC ............ H01H 9/54; H02M 7/49; H02M 1/32; H02M 7/003; H02M 5/458; H02M 7/493;
(Continued)

(56) References Cited

U.S. PATENT DOCUMENTS 5,625,545 A    4/1997  Hammond
5,986,909 A   11/1999  Hammond et al.
(Continued)

FOREIGN PATENT DOCUMENTS

CN    100431253 C    5/2008
CN    101431290 B    5/2012
CN    202309539 U    7/2012

OTHER PUBLICATIONS

International Search Report dated May 30, 2014; PCT/US2013/0602888; International Filing Date: Sep. 1, 2013; 9 pages.

*Primary Examiner* — Jung Kim

(57) ABSTRACT

Embodiments of a bypass system for a multi-cell power supply are provided. An aspect includes a plurality of power cells, each of the plurality of power cells comprising a respective bypass device comprising one or more contactors. Another aspect includes a central control. Yet another aspect includes a fiber optic ring comprising a plurality of fiber optic links that connect the respective bypass device in each of the plurality of power cells and the central control in series, wherein the fiber optic ring starts and ends at the central control, and the central control is configured to communicate with the one or more contactors in the plurality of bypass devices via the fiber optic ring.

18 Claims, 9 Drawing Sheets

(51) Int. Cl.
   *H02M 5/458*   (2006.01)
   *H02M 7/00*    (2006.01)
   *H02J 3/46*    (2006.01)
   *H02M 7/493*   (2007.01)
   *H02M 7/49*    (2007.01)
   *H02M 1/00*    (2006.01)

(52) U.S. Cl.
   CPC .............. *H02M 7/003* (2013.01); *H02M 7/49* (2013.01); *H02M 7/493* (2013.01); *H02M 2001/0003* (2013.01); *H02M 2001/325* (2013.01)

(58) Field of Classification Search
   CPC ..... H02M 2001/325; H02M 2001/0003; H02J 3/46
   See application file for complete search history.

(56) References Cited

U.S. PATENT DOCUMENTS

| | | |
|---|---|---|
| 6,222,284 B1 | 4/2001 | Hammond et al. |
| 7,388,189 B2 * | 6/2008 | Spanier .............. H04B 10/2755 250/208.4 |
| 8,093,764 B2 | 1/2012 | Hammond |
| 8,976,554 B2 * | 3/2015 | Mihalache .............. H02M 7/49 363/50 |
| 2007/0002773 A1 * | 1/2007 | Wang .................... H04L 12/422 370/258 |
| 2008/0174182 A1 | 7/2008 | Hammond |
| 2010/0301975 A1 | 2/2010 | Hammond |

\* cited by examiner

FIBER OPTIC RING FOR BYPASS SYSTEM IN MULTI-CELL POWER SUPPLY

BACKGROUND

This disclosure relates generally to multi-cell power supplies, and more particularly to a fiber optic ring for a bypass system of a multi-cell power supply.

In certain applications, multi-cell power supplies utilize modular power cells to process power between a source and a load. Such modular power cells can be applied to a given power supply with various degrees of redundancy to improve the availability of the power supply. For example, FIG. 1 illustrates various embodiments of a prior art power supply (e.g., an AC motor drive) having nine such power cells. The power cells in FIG. 1 are represented by a block having input terminals A, B, and C; and output terminals T1 and T2. In FIG. 1, a transformer or other multi-winding device 110 receives three-phase, medium-voltage power at its primary winding 112, and delivers power to a load 130 such as a three-phase AC motor via an array of single-phase inverters (also referred to as power cells). Each phase of the power supply output is fed by a group of series-connected power cells, called herein a "phase-group".

The transformer 110 includes primary windings 112 that excite a number of secondary windings 114-122. Although primary winding 112 is illustrated as having a star configuration, a mesh configuration is also possible. Further, although secondary windings 114-122 are illustrated as having a delta or an extended-delta configuration, other configurations of windings may be used as described in U.S. Pat. No. 5,625,545 to Hammond, the disclosure of which is incorporated herein by reference in its entirety. In the example of FIG. 1 there is a separate secondary winding for each power cell. However, the number of power cells and/or secondary windings illustrated in FIG. 1 is merely exemplary, and other numbers are possible. Additional details about such a power supply are disclosed in U.S. Pat. No. 5,625,545.

Any number of ranks of power cells are connected between the transformer 110 and the load 130. A "rank" in the context of FIG. 1 is considered to be a three-phase set, or a group of three power cells established across each of the three phases of the power delivery system. Referring to FIG. 1, rank 150 includes power cells 151-153, rank 160 includes power cells 161-163, and rank 170 includes power cells 171-173. A master control system 195 sends command signals to local controls in each power cell over fiber optics or another wired or wireless communications medium 190. It should be noted that the number of power cells per phase depicted in FIG. 1 is exemplary, and more than or less than three ranks may be possible in various embodiments.

FIG. 2 illustrates various embodiments of a prior art power cell 210 which is representative of various embodiments of the power cells of FIG. 1. The power cell 210 includes a three-phase diode-bridge rectifier 212, one or more direct current (DC) capacitors 214, and an H-bridge inverter 216. The rectifier 212 converts the alternating current (AC) voltage received at power cell input 218 (i.e., at input terminals A, B and C) to a substantially constant DC voltage that is supported by each capacitor 214 that is connected across the output of the rectifier 212. The output stage of the power cell 210 includes an H-bridge inverter 216 which includes two poles, a left pole and a right pole, each with two switching devices. The inverter 216 transforms the DC voltage across the DC capacitors 214 to an AC output at the power cell output 220 (i.e., across output terminals T1 and T2) using pulse-width modulation (PWM) of the semiconductor devices in the H-bridge inverter 216.

As shown in FIG. 2, the power cell 210 may also include fuses 222 connected between the power cell input 218 and the rectifier 212. The fuses 222 may operate to help protect the power cell 210 in the event of a short-circuit failure. According to other embodiments, the power cell 210 is identical to or similar to those described in U.S. Pat. No. 5,986,909 (the "'909 Patent") and its derivative U.S. Pat. No. 6,222,284 (the "'284 Patent) to Hammond and Aiello, the disclosures of which are incorporated herein by reference in their entirety.

FIG. 3 illustrates various embodiments of a prior art bypass device 230 connected to output terminals T1 and T2 of the power cell 210 of FIG. 2. In general, when a given power cell of a multi-cell power supply fails in an open-circuit mode, the current through all the power cells in that phase-group will go to zero, and further operation is not possible. A power cell failure may be detected by comparing a power cell output voltage to the commanded output, by checking or verifying power cell components, through the use of diagnostics routines, etc. In the event that a given power cell should fail, it is possible to bypass the failed power cell and continue to operate the multi-cell power supply at reduced capacity.

The bypass device 230 is a single pole single throw (SPST) contactor, and includes a contact 232 and a coil 234. As used herein, the term "contact" generally refers to a set of contacts having stationary portions and a movable portion. Accordingly, the contact 232 includes stationary portions and a movable portion which is controlled by the coil 234. The bypass device 230 may be installed as an integral part of a converter subassembly in a drive unit. In other applications the bypass device 230 may be separately mounted. When the movable portion of the contact 232 is in a bypass position, a shunt path is created between the respective output lines connected to output terminals T1 and T2 of the power cell 210. Stated differently, when the movable portion of the contact 232 is in a bypass position, the output of the failed power cell is shorted. Thus, when power cell 210 experiences a failure, current from other power cells in the phase group can be carried through the bypass device 230 connected to the failed power cell 210 instead of through the failed power cell 210 itself.

FIG. 4 illustrates various embodiments of a different bypass device 240 according to the prior art connected to output terminals T1 and T2 of the power cell 210. The bypass device 240 is a single pole double throw (SPDT) contactor, and includes a contact 242 and a coil 244. The contact 242 includes stationary portions and a movable portion which is controlled by the coil 244. When the movable portion of the contact 242 is in a bypass position, one of the output lines of the power cell 210 is disconnected (e.g., the output line connected to output terminal T2 in FIG. 4) and a shunt path is created between the output line connected to output terminal T1 of the power cell 210 and a downstream portion of the output line connected to output terminal T2 of the power cell 210. The shunt path carries current from other power cells in the phase group which would otherwise pass through the power cell 210. Thus, when power cell 210 experiences a failure, the output of the failed power cell is not shorted as is the case with the bypass configuration of FIG. 3.

The bypass devices shown in FIGS. 3 and 4 do not operate to disconnect power to any of the input terminals A, B or C in the event of a power cell failure. Thus, in certain situations, if the failure of a given power cell is not severe enough to cause the fuses 222 (see FIG. 2) to disconnect power to any two of input terminals A, B or C, the failure can continue to cause damage to the given power cell.

U.S. Pat. No. 8,093,764, entitled "Method and System for Bypassing a Power cell of a Power Supply", which is hereby incorporated by reference in its entirety, describes a multi-cell power supply that includes bypass devices that enable the insulation of a failed power cell of the multi-cell power supply from the remaining, functional power cells. However, at power-up after a power outage of the multi-cell power supply, the bypass devices of the multi-cell power supply may be initialized in a rest condition, in which all of the bypass devices are in the same state. In such a multi-cell power supply, the central control does not need to communicate with the contactors at power-up, and the state of the multi-cell power supply is not preserved in the case of a power outage.

SUMMARY

Embodiments of a bypass system for a multi-cell power supply are provided. An aspect includes a plurality of power cells, each of the plurality of power cells comprising a respective bypass device comprising one or more contactors. Another aspect includes a central control. Yet another aspect includes a fiber optic ring comprising a plurality of fiber optic links that connect the respective bypass device in each of the plurality of power cells and the central control in series, wherein the fiber optic ring starts and ends at the central control, and the central control is configured to communicate with the one or more contactors in the plurality of bypass devices via the fiber optic ring.

Embodiments of a method of operating a bypass system for a multi-cell power supply, the multi-cell power supply comprising a plurality of power cells, each of the plurality of power cells comprising a respective bypass device comprising one or more contactors, and a central control, are provided. An aspect includes communicating by the central control with the one or more contactors in the respective bypass device in each of the plurality of power cells via a fiber optic ring, the fiber optic ring comprising a plurality of fiber optic links that connect the plurality of bypass devices and the central control in series, wherein the fiber optic ring starts and ends at the central control.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Figure 1:
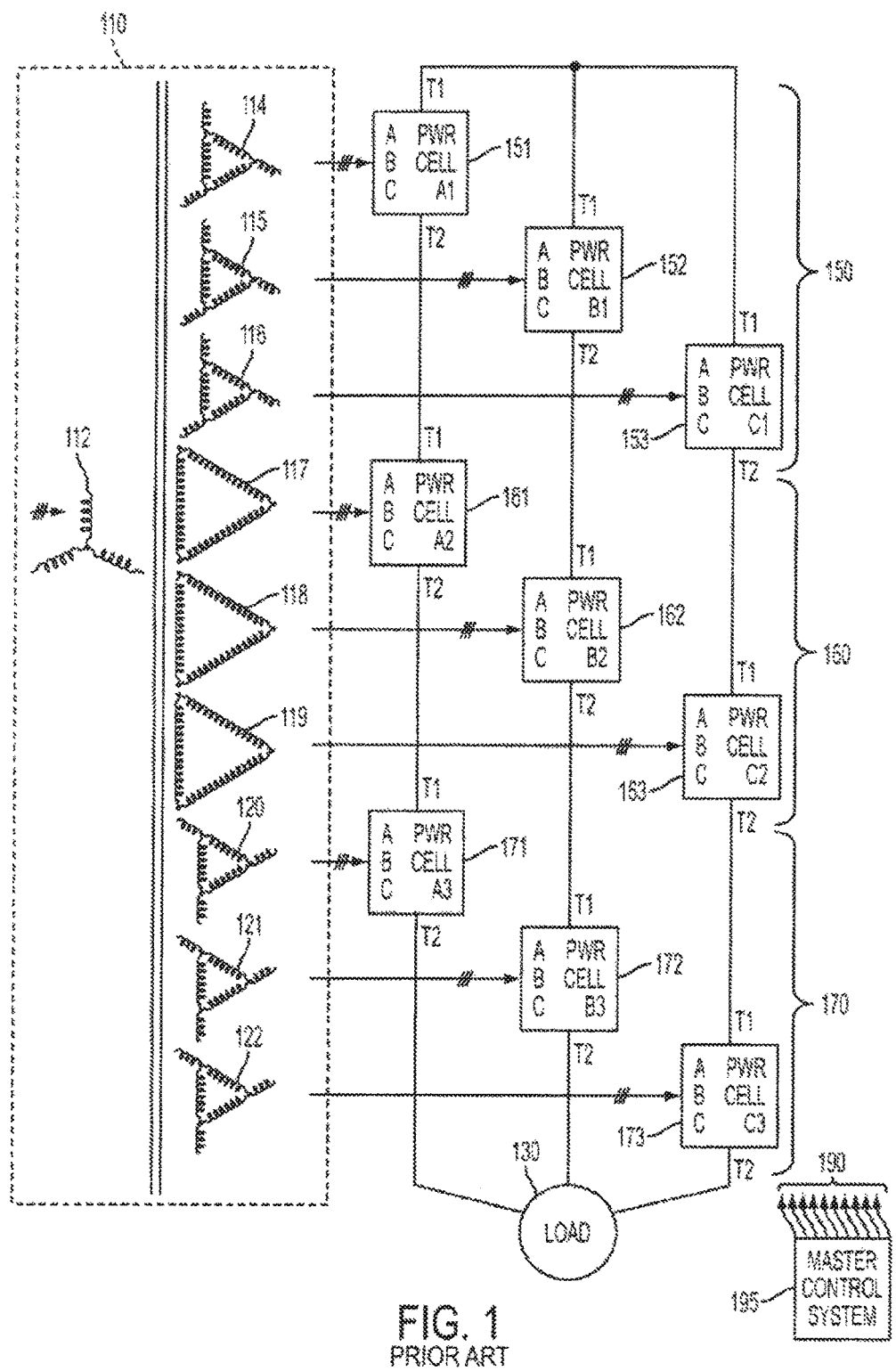
FIG. 1 illustrates various embodiments of a multi-cell power supply according to the prior art.
Figure 2:
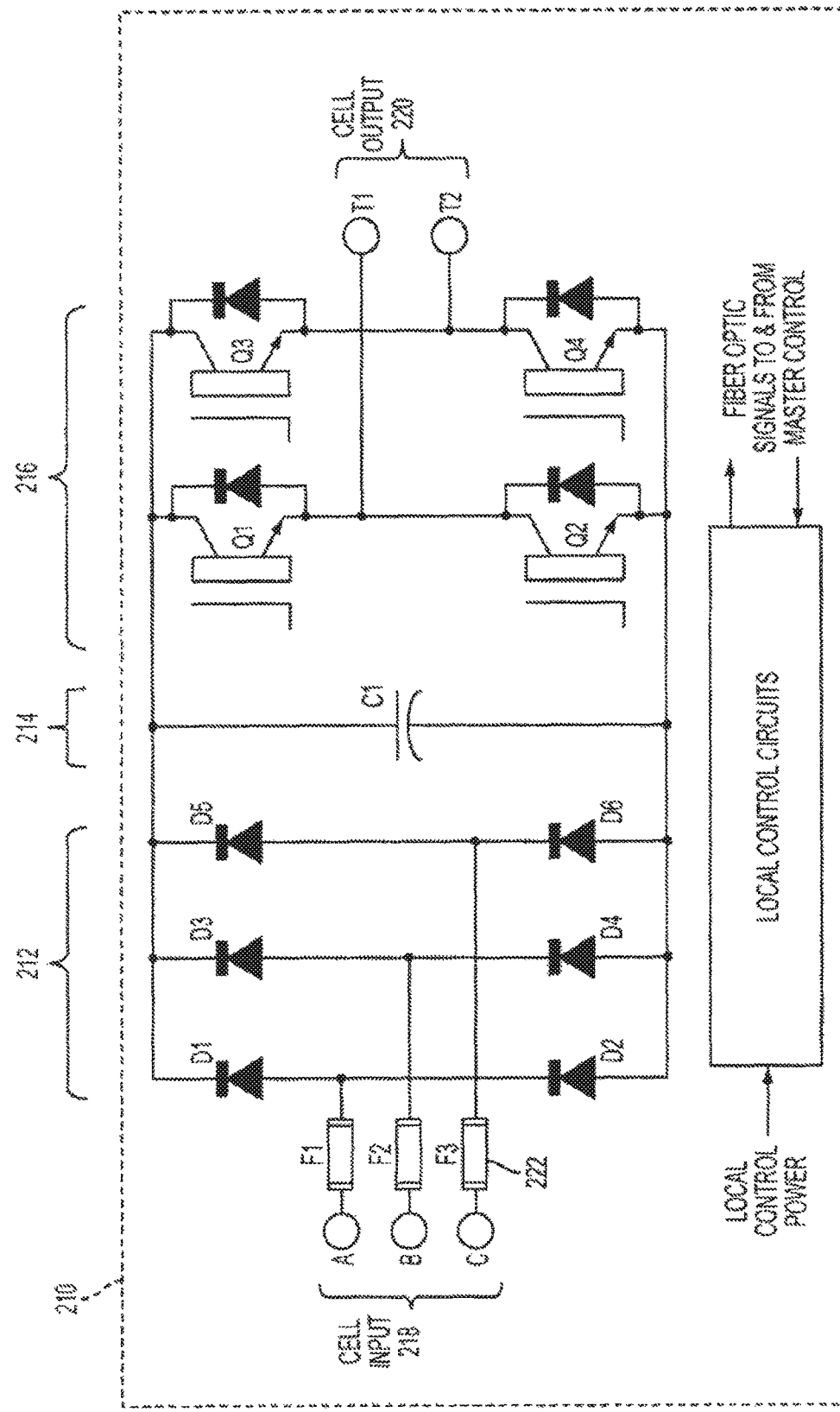
FIG. 2 illustrates various embodiments of a power cell of the multi-cell power supply of FIG. 1 according to the prior art.
Figure 3:
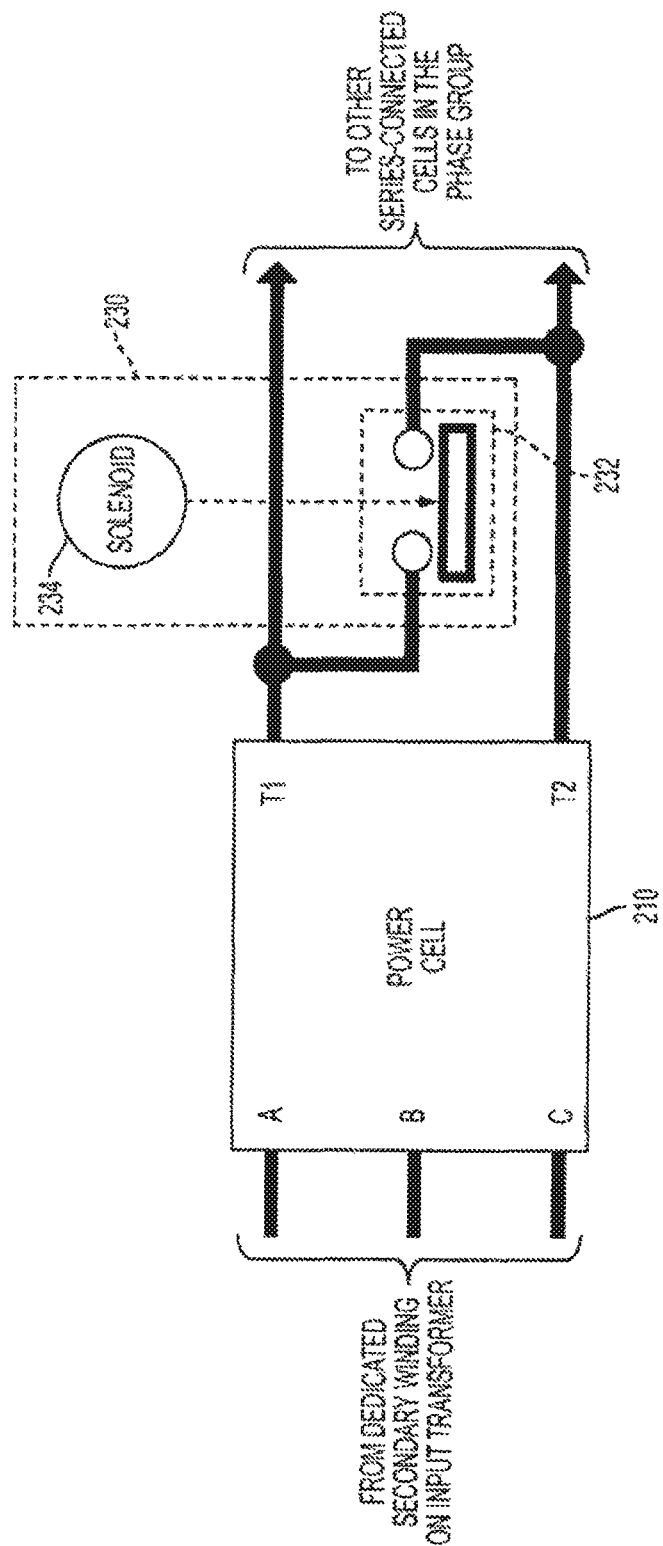
FIG. 3 illustrates various embodiments of a bypass device connected to an output of the power cell of FIG. 2 according to the prior art.
Figure 4:
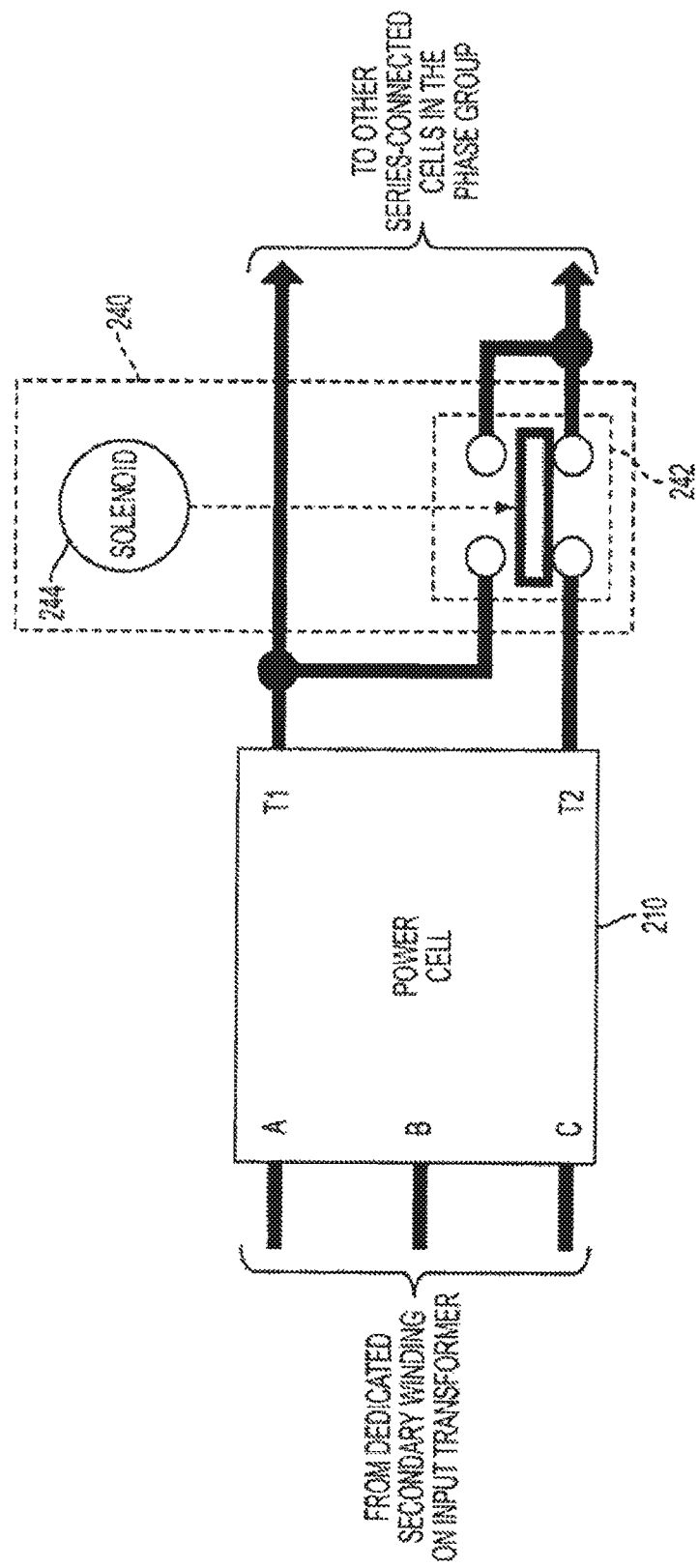
FIG. 4 illustrates various embodiments of a bypass device connected to an output of the power cell of FIG. 2 according to the prior art.

Embodiments of a fiber optic ring for a bypass system of a multi-cell power supply are provided, with exemplary embodiments being discussed below in detail. The bypass devices, which each include one or more contactors, in the power cells of the multi-cell power supply are connected to the central control via a fiber optic ring that links the power cells. The central control of the multi-cell power supply exchanges information with the bypass devices in the power cells regarding their respective contactor states during normal operation and at power-up. The fiber optic ring has relatively high immunity to the electro-magnetic noise generated by the power cells of the power supply and is independent of the high differences in voltage among the various power cells. The fiber optic ring allows preservation of the state of the multi-cell power supply after a total power outage.

A bypass device in power cell of the multi-cell power supply comprises multiple contactors in some embodiments, and each of the contactors within a power cell individually provides feedback to, and is commanded by, the central control via the fiber optic ring. The contactors comprise bi-stable contactors that maintain their state in case of power outage in some embodiments. Bi-stable contactors require power to change state (e.g., to open or close). Once the contactor is in a desired state, that state is maintained by the contactor for an indefinite time without application of further power. The central control, via the fiber optic ring, commands contactors in the power cells to open or close as needed during operation of the multi-cell power supply. The central control also stores state information for the contactors, and the stored state information is preserved in the central control in the case of a complete power outage of the multi-cell power supply. At power-up, the central control may interrogate the bi-stable contactors regarding their current state via the fiber optic ring, and check the interrogation state data against the stored state data. This ensures that the multi-cell power supply operates in a correct state at power-up after a power outage. In the case of a failed power cell, the state of the contactors in the plurality of power cells corresponds to a full or partial bypass of the failed power cell.

The fiber optic ring comprises a duplex fiber optic ring in some embodiments, allowing full communication between the central control and the contactors located in the power cells of the multi-cell power supply in case of an outage of the link between the central control and the controls of the power cells. The duplex fiber optic ring allows full communications between the central control and the contactors included in the power cells of the multi-cell power supply also in case of an outage of a link in the fiber optic ring itself. A duplex fiber optic ring that links the central control to the plurality of power cell contactors allows transmission of high volume, high speed command information to the contactors in the multi-cell power supply. Further, a fiber optic ring has relatively high immunity to the electro-magnetic noise of that environment. The fiber optic ring also provides voltage insulation, as each power cell in the multi-cell power supply operates at a different voltage, and the serial connection of the power cells by the fiber optic ring may build up relatively high potentials between the power cells and the central control. The ring starts and ends with the central control, so that a physical interruption in the fiber optic ring does not compromise the communication between the control system and the contactors in the plurality of power cells. The protocol used to communicate between the central control and the contactors is based on a master-slave scheme in which the master is the central control and the slaves are the contactors. The fiber optic ring that coordinates the contactors is independent from the communication link that coordinates the power control of the power cells.

Figure 5:
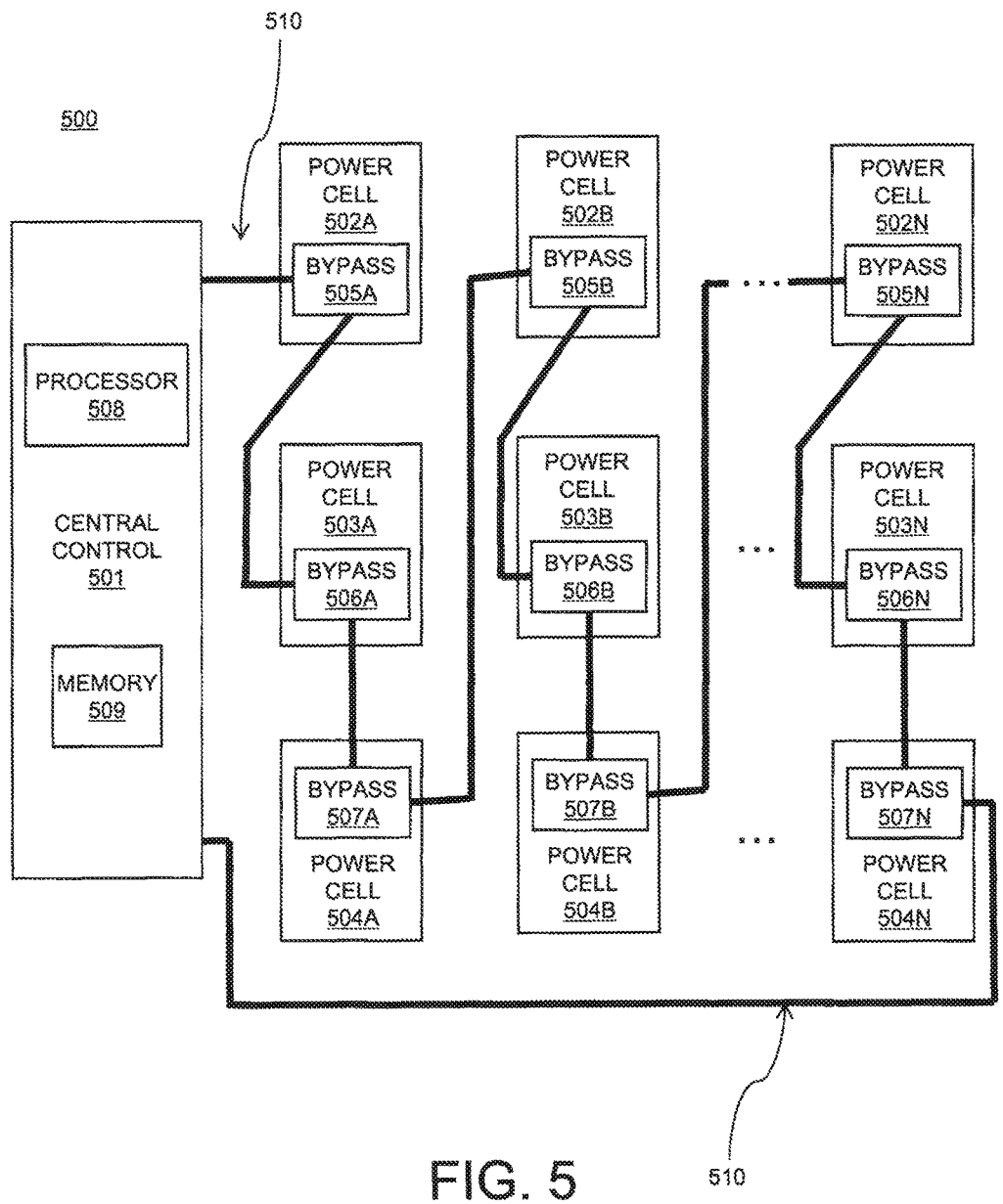
FIG. 5 is a block diagram illustrating an embodiment of a multi-cell power supply system with a bypass system including a fiber optic ring.

FIG. 5 illustrates an embodiment of a multi-cell power supply 500 comprising a central control 501 and a plurality of power cells 502A-N, 503A-N, and 504A-N. Each of power cells 502A-N, 503A-N, and 504A-N comprises a respective bypass device 505A-N, 506A-N, and 507A-N that are linked by a fiber optic ring 510 to make up a bypass system for the multi-cell power supply 500. Each of bypass devices 505A-N, 506A-N, and 507A-N may comprise one or more contactors. Fiber optic ring 510 may comprise a duplex fiber optic ring in some embodiments, allowing bi-directional communication via the fiber optic ring 510. The fiber optic ring 510 starts and ends at the central control 501. Each bypass device of the plurality of bypass devices 505A-N, 506A-N, and 507A-N is connected in series via the fiber optic ring 510. Central control 501 may comprise a processor 508 and a memory 509 in some embodiments, and may communicate with the contactors in the plurality of bypass devices 505A-N, 506A-N, and 507A-N via the fiber optic ring 510. Central control 501 may store the states of the contactors in the plurality of bypass devices 505A-N, 506A-N, and 507A-N in the memory 509 in some embodiments; the memory 509 may comprise a persistent memory that stores contactor state data during a power outage of the multi-cell power supply 500. FIG. 5 is shown for illustrative purposes only; a multi-cell power supply such as multi-cell power supply 500 may include any appropriate number of power cells in various embodiments.

The central control 501 and fiber optic ring 510 shown in FIG. 5 are used to control the contactors in the plurality of bypass devices 505A-N, 506A-N, and 507A-N for isolation of a failed power cell of power cells 502A-N, 503A-N, and 504A-N, and are independent of the power input and output of the multi-cell power supply 500. The multi-cell power supply 500 is powered by a multi-phase power transformer having multiple secondary windings, as shown in FIG. 1, feeding the plurality of power cells 502A-N, 503A-N, and 504A-N. In some embodiments, each of power cells 502A-N, 503A-N, and 504A-N has a 3-phase input connected to a dedicated secondary winding on the transformer, and a 1-phase output which is connected in series with the output of other power cells so to generate the required voltage level at a power output of the multi-cell power supply. In some embodiments, a power cell of power cells 502A-N, 503A-N, and 504A-N includes a chassis, a plurality of capacitors, a plurality of bus bars, a plurality of insulated gate bipolar transistors (IGBTs), a plurality of diodes, and a controller. Controllers in the power cells 502A-N, 503A-N, and 504A-N receive power control commands from the central control 501 via an independent power communication link, such as communications medium 190 that was shown in FIG. 1. The central control 501 may send commands to the bypass devices 505A-N, 506A-N, and 507A-N via the fiber optic ring 510 to isolate a failed power cell. In the case of a failed power cell, which may comprise a failure of any of the elements of a power cell, including the independent power communication link to the central control 501, the failed power cell is isolated from the remaining power cells so to permit to the multi-cell power supply to continue operations. Isolation of a failed power cell is achieved via one or more contactors in the bypass device of the failed power cell, and may comprise a full or partial bypass of the failed power cell. Embodiments of a bypass device of a power cell, and a contactor within a bypass device, are described in further detail below with respect to FIGS. 6 and 7.

Figure 6:
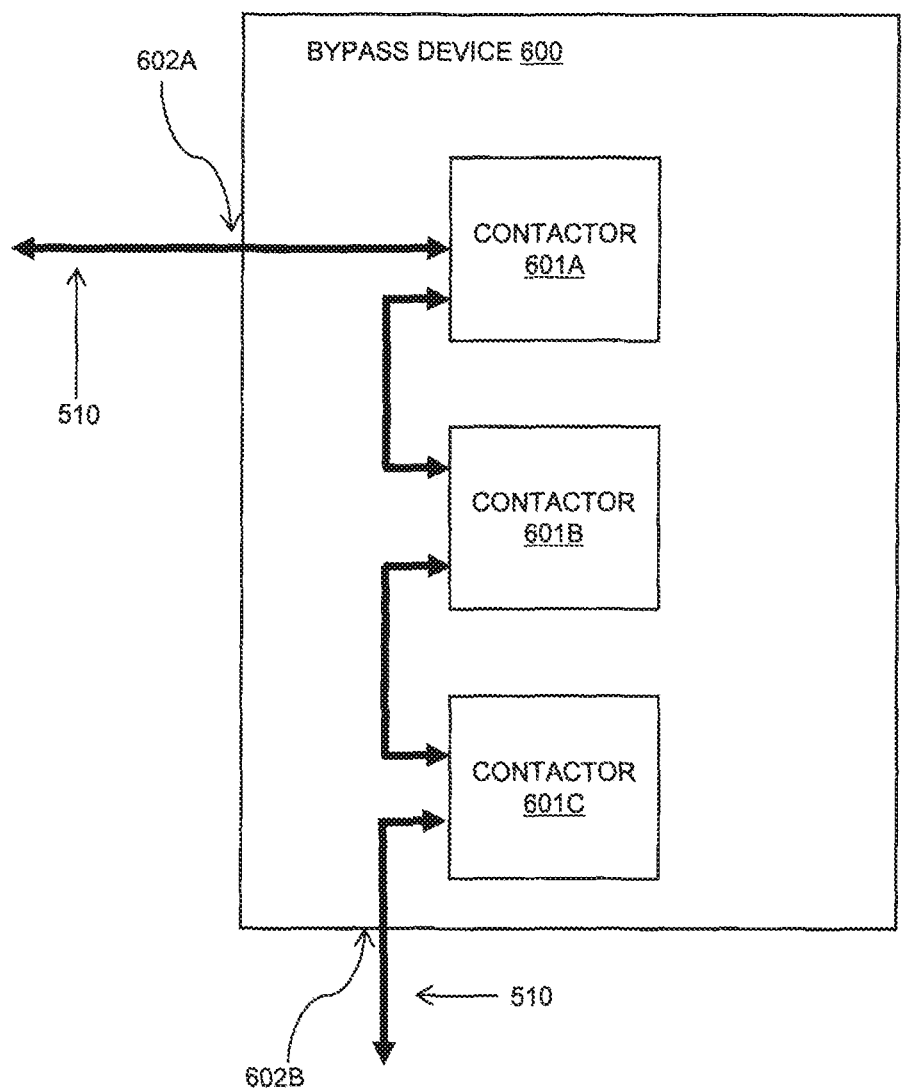
FIG. 6 is a block diagram illustrating an embodiment of a bypass device of a power cell of the multi-cell power supply with a fiber optic ring of FIG. 5.

FIG. 6 illustrates an embodiment of a bypass device 600, which may comprise any of the plurality of bypass devices 505A-N, 506A-N, and 507A-N that are shown in FIG. 5. Bypass device 600 includes contactors 601A, 601B, and 601C. In some embodiments, contactor 601A connects a power output of the power cell in which bypass device 600 is located to a power output of the multi-cell power supply 500, and contactors 601B-C may connect the power input of the power cell in which the bypass device 600 is located to the winding of the transformer. Isolation of a failed power cell may be achieved by disconnecting the power output of the failed power cell from the serial chain of power cells by contactors 601A-C, while continuing to provide electrical continuity via a bypass connection through the bypass device 600 in the failed power cell between the two power cells that are adjacent to the failed power cell in the ring. For example, if power cell 503B of FIG. 5 fails, one or more contactors in power cell 503B may be opened to disconnect power cell 503B from the power input and output of the multi-cell power supply 500; however, power cells 502B and 504B may continue to be electrically linked to one another, and to the power input and output of the multi-cell power supply 500, via a bypass link in the bypass device 600 in failed power cell 503B. Bypass device 600 includes a first connection 602A and second connection 602B to the fiber optic ring 510. In embodiments in which fiber optic ring 510 comprises a duplex fiber optic ring, each of connections 602A and 602B may comprise an input and an output to the fiber optic ring 510 for bidirectional communication with central control 501. FIG. 6 is shown for illustrative purposes only; a bypass device such as bypass device 600 may include any appropriate number of contactors in various embodiments.

Figure 7:
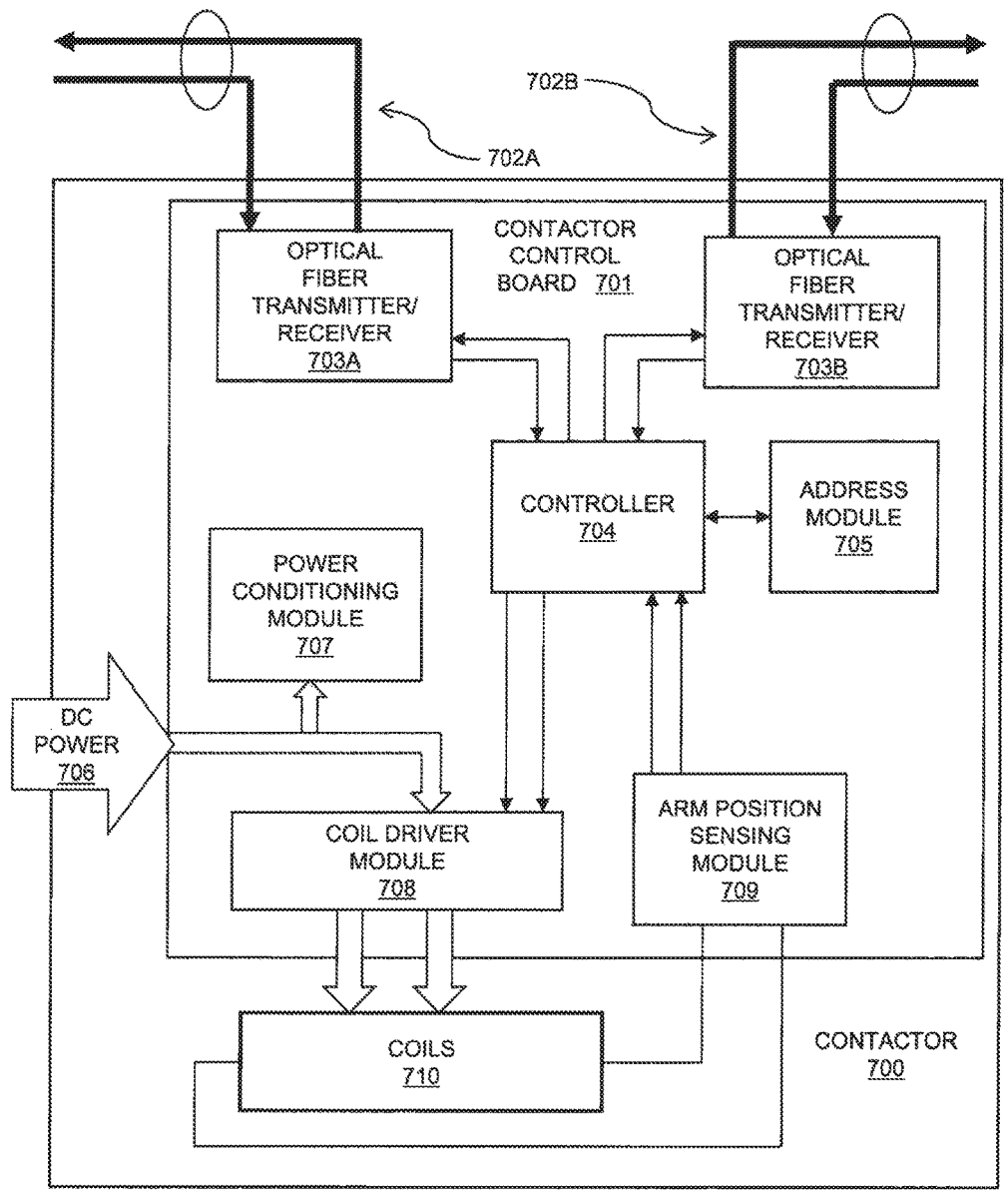
FIG. 7 is a block diagram illustrating an embodiment of a contactor of the bypass device of FIG. 6 of a multi-cell power supply with a fiber optic ring.

FIG. 7 illustrates an embodiment of a contactor 700, which may comprise any of contactors 601A-C of bypass device 600 of FIG. 6. The contactor 700 includes a contactor control board 701, which includes optical fiber transmitter/receivers 703A-B for communication with duplex fiber optic links 702A-B of fiber optic ring 510. If there is an outage in one of fiber optic links 702A-B, the contactor 700 maintains full communication with the central control 501 via the remaining duplex fiber optic link of fiber optic link 702A-B. The contactor control board 701 further comprises a controller 704 that communicates with central control 501 via optical fiber transmitter/receivers 703A-B and duplex fiber optic links 702A-B. The controller 704 is in communication with an address module 705; an arm position sensing module 709, and a coil driver module 708. The address module 705 identifies the individual contactor 700 to the central control 501. The arm position sensing module 709 indicates, based on the position of the coils 710, whether the contactor is open or closed. The contactor 700 has a DC power input 706 that receives power from the windings of the multi-cell power supply 500. The DC power from DC power input 706 is conditioned by power conditioning module 707, and output to coils 710 via coil driver module 708. The coils 710 may be bi-stable, and may comprise a magnetically latching solenoid in some embodiments. The coil driver module 708 may change the position of an armature in the magnetically latching solenoid that comprises coils 710 in order to change the state of the contactor 700 to open or closed. The arm position sensing module 709 may detect the position of the armature in the magnetically latching solenoid that comprises coils 710 in order to determine the state of the contactor 700. Various embodiments of detection of the position of an armature within a magnetically latching solenoid are further discussed in U.S. Pat. No. 8,319,589 entitled "Position Sensor for Mechanically Latching Solenoid," and in U.S. Pat. No. 8,441,147, entitled "Device and System for Bypassing a Power cell of a Power Supply", the contents of which are both hereby incorporated in their entirety.

Figure 8:
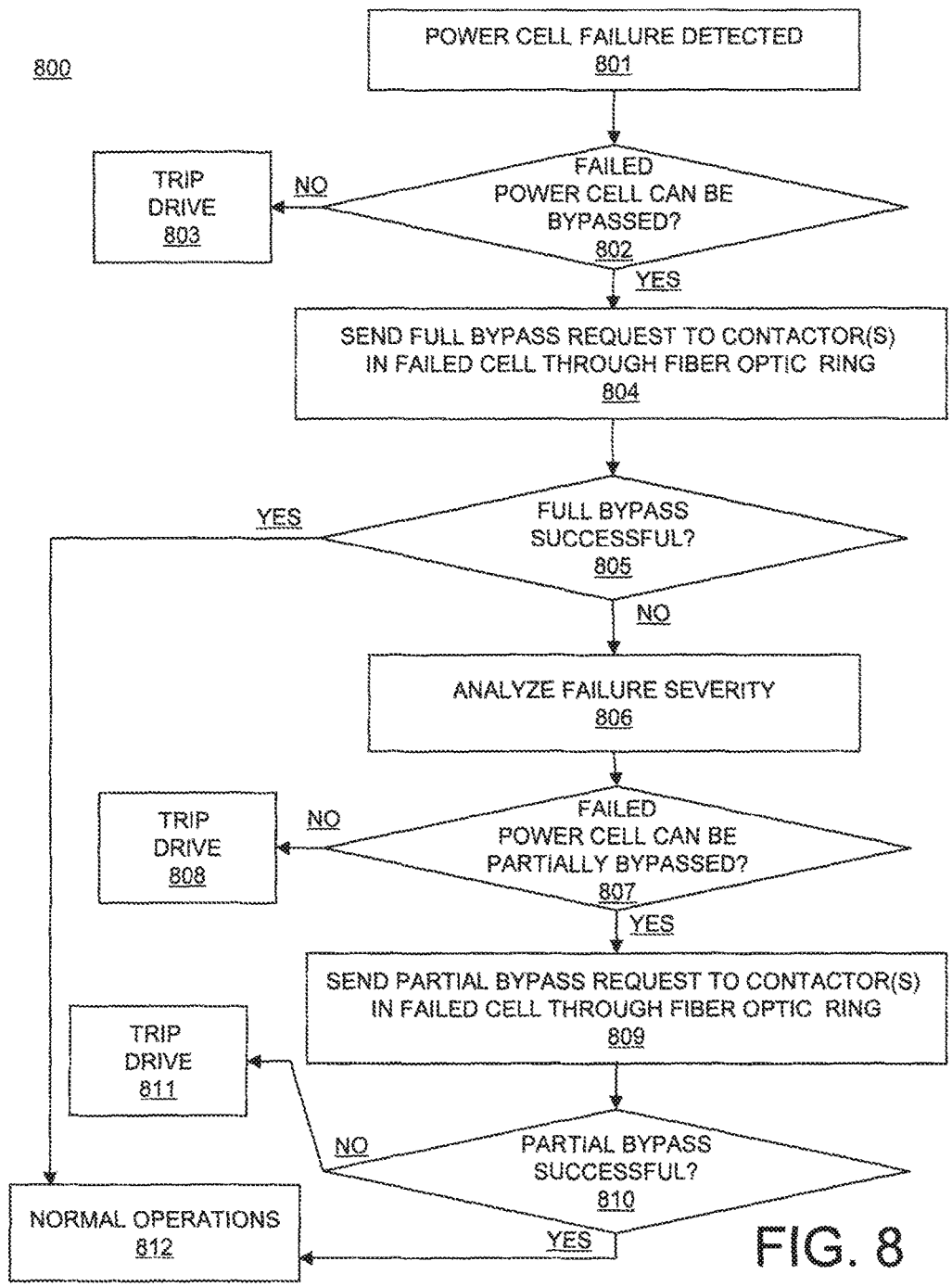
FIG. 8 is a flowchart illustrating an embodiment of a method for bypass of a failed power cell by a central control in a multi-cell power supply with a fiber optic ring.

FIG. 8 is a flowchart illustrating an embodiment of a method for bypass of a failed power cell by a central control in a multi-cell power supply with a fiber optic ring. FIG. 8 is discussed with respect to FIGS. 5-7, and method 800 is implemented in central control 501 of FIG. 5. First, in block 801, a failure is detected in a power cell in multi-cell power supply 500 by central control 501. For example, power cell 503B of power cells 502A-N, 503A-N, and 504A-N may be determined to have failed in block 801. The power cell failure may comprise a failure of any element of the failed power cell. Next, in block 802, the central control 501 checks the states of the bypass devices 505A-N, 506A-N, and 507A-N in the plurality of power cells 502A-N, 503A-N, and 504A-N determines whether the failed power cell can be bypassed. If it is determined in block 802 that the failed power cell cannot be bypassed (for example, if a threshold number of other power cells in the multi-cell power supply have already been bypassed), flow proceeds to block 803, the power drive for the multi-cell power supply 500 is tripped, the multi-cell power supply 500 is disabled, and method 800 ends. If it is determined in block 802 that the failed power cell can be bypassed, flow proceeds from block 802 to block 804, in which the central control 501 sends, via the fiber optic ring 510, a full bypass request to the contactors 601A-C in the bypass device 600 of the failed power cell, and the contactors 601A-C/700 in the failed power cell processes the full bypass request. The full bypass request may be processed by the controller 704 in each of contactor 601A-C/700 to cause coil driver module 708 to energize the coils 710 to completely disconnect the power cell, while continuing to provide electrical continuity between adjacent power cells (e.g., power cells 502B and 504B, in the case of a failed power cell 503B) in the multi-cell power supply 500 via a bypass path through bypass device, e.g. bypass device 506B/600. Next, in block 805, it is determined whether the full bypass request that was sent by the central control 501 in block 804 was successful. This may be determined based on information from the arm position sensing modules 709 in the contactors 601A-C/700 in the failed power cell, which may be relayed to the central control 501 via controller 704 and fiber optic ring 510. If it is determined in block 805 that the full bypass request that was sent in block 805 was successful, flow proceeds to block 812, and normal operations of the multi-cell power supply 500 resume, with the failed power cell being bypassed. The current state, corresponding to the full bypass of the failed power cell, of each of the individual contactors 601A-C in each of the plurality of power cells 502A-N, 503A-N, and 504A-N is stored in memory 509 of central control 501.

If it is determined in block 805 that the bypass request that was sent in block 804 was not successful, flow proceeds from block 805 to block 806, in which the severity of the power cell failure is analyzed by the central control 501 via the independent power communication link. Then, in block 807, it is determined based on the failure severity analysis of block 806 whether the failed power cell can be partially bypassed. If it is determined in block 807 that the failed power cell cannot be partially bypassed, flow proceeds to block 808, the power drive for the multi-cell power supply 500 is tripped, and method 800 ends. If it is determined by central control 501 in block 807 that the failed power cell can be partially bypassed, flow proceeds from block 807 to block 809, in which the central control 501 sends a bypass request to some, but not all, of the contactors 601A-C in the bypass device in the failed power cell, and the contactors 601A-C/700 process the bypass request. The bypass request may be processed by the controller 704 to cause coil driver module 708 to move an armature in the coils 710 to partially disconnect the power cell, while continuing to provide electrical continuity between adjacent power cells (e.g., power cells 502B and 504B) in the multi-cell power supply 500 via a bypass path through the bypass device of the failed power cell (e.g., bypass device 506B of power cell 503B). Next, in block 810, it is determined whether the partial bypass request that was sent in block 809 was successful. This may be determined based on information from the arm position sensing modules 709 in the one or more contactors 601A-C/700 in the bypass device of the failed power cell, which may be relayed to the central control 501 via controller 704 and fiber optic ring 510. If it is determined in block 810 that the partial bypass request that was sent in block 809 was not successful, flow proceeds from block 810 to block 811, and power drive for the multi-cell power supply 500 is tripped, and method 800 ends. If it is determined in block 810 that the partial bypass request that was sent in block 809 was successful, flow proceeds to block 812, and normal operations of the multi-cell power supply 500 resume. The current state, corresponding to the partial bypass of the failed power cell, of each of the individual contactors 601A-C in each of the plurality of power cells 502A-N, 503A-N, and 504A-N is stored in memory 509 of central control 501. In the case of a full or partial bypass, the normal operations that resume in block 812 may comprise a failed mode of the multi-cell power supply, which is described in further detail in U.S. Pat. No. 5,986,909, entitled "Multiphase Power Supply with Plural Series Connected Power cells and Failed Power cell Bypass", which is herein incorporated by reference in its entirety.

Figure 9:
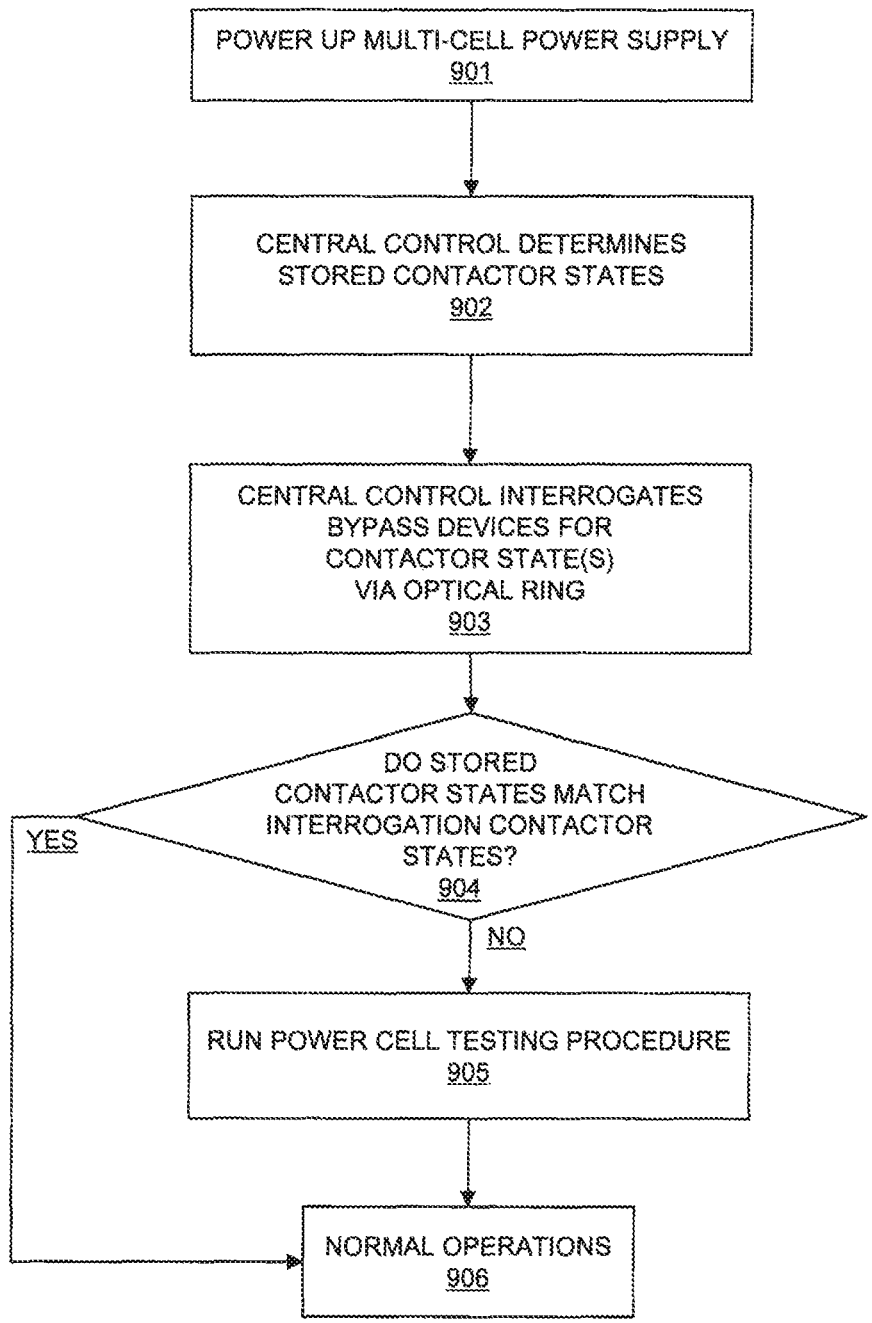
FIG. 9 is a flowchart illustrating an embodiment of a method for startup of a multi-cell power supply with a fiber optic ring.

FIG. 9 is a flowchart illustrating an embodiment of a method for startup of a multi-cell power supply with a fiber optic ring. FIG. 9 is discussed with respect to FIGS. 5-7, and method 900 is implemented in central control 501 of FIG. 5. First, in block 901, the multi-cell power supply 500 with a fiber optic ring 510 is powered up after a power outage. Then, in block 902, the central control 501 determines the stored contactor states of the plurality of power cells in the multi-cell power supply 500 from the memory 509 of the central control 501. Next, in block 903, the central control 501 interrogates the contactors 601A-C in the bypass devices 505A-N, 506A-N, and 507A-N of the power cells 502A-N, 503A-N, and 504A-N for state information via the fiber optic ring 510. The state information is relayed in response to the interrogation to the central control 501 via fiber optic ring 510 from controller 704 and arm position sensing module 709 in each contactor control board 701 in each of the contactors 601A-C/700 in the bypass devices 505A-N, 506A-N, and 507A-N. Flow then proceeds to block 904, in which the stored contactor states determined in block 902 are compared to the contactor states that were determined by interrogation of the contactors via the fiber optic ring 510 in block 903. If it is determined in block 904 that the stored contactor states of block 902 do not match the contactor states that were determined via the fiber optic ring in block 903, flow proceeds to block 905, in which the central control 501 runs a power cell testing procedure on the plurality of power cells 502A-N, 503A-N, and 504A-N to determine the correct contactor states for the multi-cell power supply 500, and it is ensured that the contactors 601A-C are in the correct respective states in each of the bypass device 505A-N, 506A-N, and 507A-N of the power cells 502A-N, 503A-N, and 504A-N. If a power cell failure is detected during block 905, central control 501 may perform method 800 of FIG. 8 to bypass the detected power cell failure. Then, in block 906, normal operations of the multi-cell power supply 500 resume. If it is determined in block 904 that the stored contactor states match the contactor states that was determined by interrogation via the fiber optic ring, flow proceeds directly from block 904 to block 906, and normal operations of the multi-cell power supply 500 resume.

The technical effects and benefits of exemplary embodiments include robust communication between a central control and bypass contactors of the power cells of a multi-cell power supply.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A bypass system for a multi-cell power supply, comprising:
a plurality of power cells, each of the plurality of power cells comprising a respective bypass device comprising one or more contactors;
a central control; and
a fiber optic ring comprising a plurality of fiber optic links that connect the respective bypass device in each of the plurality of power cells and the central control in series, wherein the fiber optic ring starts and ends at the central control, and the central control is configured to communicate with the one or more contactors in the plurality of bypass devices via the fiber optic ring, wherein a contactor comprises:
a first optical fiber transmitter/receiver for communication with a first fiber optic link of the fiber optic ring;
a second optical fiber transmitter/receiver for communication with a second fiber optic link of the fiber optic ring;
a controller that communicates with the central control via the first and second optical fiber transmitter/receivers.

2. The bypass system of claim 1, wherein the fiber optic ring comprises a duplex fiber optic ring, and wherein in the event of an outage in a fiber optic link of the fiber optic ring, the central control communicates with the one or more contactors in each of the plurality of bypass devices via the remaining plurality of fiber optic links of the fiber optic ring.

3. The bypass system of claim 1, the contactor further comprising an arm position sensing module that is configured to determine a state of the contactor; and
wherein the controller is configured to communicate the state of the contactor that is determined by the arm position sensing module to the central control via at least one of the first and second optical fiber transmitter/receivers.

4. The bypass system of claim 3, wherein the contactor comprises a bi-stable contactor, and the state of the contactor corresponds to one of a full bypass and a partial bypass of the power cell in which the contactor is located.

5. The bypass system of claim 3, wherein the contactor comprises a magnetically latched solenoid, and wherein the arm position sensing module determines the state of the contactor based on a position of an armature in the magnetically latched solenoid.

6. The bypass system of claim 1, wherein the central control is configured to, based on a power-up of the multi-cell power supply:
interrogate the one or more contactors in the respective bypass device of each of the plurality of power cells for state information via the fiber optic ring; and
receive the state information in response to the interrogation from the one or more contactors via the fiber optic ring.

7. The bypass system of claim 6, wherein the central control comprises a memory, and is further configured to:
store received state information for each of the one or more contactors in the respective bypass device of each of the plurality of power cells in the memory; and
based on the received state information in response to the interrogation from the one or more contactors in the respective bypass device of each of the plurality of power cells via the fiber optic ring, compare the received state information to the stored state information.

8. The bypass system of claim 7, the central control further configured to:
determine, based on the comparison, a correct state of the one or more contactors in the respective bypass device of each of the plurality of power cells.

9. The bypass system of claim 1, the central control configured to:

detect a failure in a power cell of the plurality of power cells; and based on detection of the failure of the power cell, send a bypass command to one or more contactors in the bypass device of the failed power cell via the fiber optic ring; and store state information corresponding to the bypass command for the one or more contactors in the failed power cell.

10. The bypass system of claim 9, wherein the bypass command corresponds to one of a full bypass of the failed power cell and a partial bypass of the failed power cell.

11. A method of operating a bypass system for a multi-cell power supply, the multi-cell power supply comprising a plurality of power cells, each of the plurality of power cells comprising a respective bypass device comprising one or more contactors, and a central control, the method comprising:

communicating by the central control with the one or more contactors in the respective bypass device in each of the plurality of power cells via a fiber optic ring, the fiber optic ring comprising a plurality of fiber optic links that connect the plurality of bypass devices and the central control in series, wherein the fiber optic ring starts and ends at the central control, wherein a contactor comprises:
- a first optical fiber transmitter/receiver for communication with a first fiber optic link of the fiber optic ring;
- a second optical fiber transmitter/receiver for communication with a second fiber optic link of the fiber optic ring;
- a controller that communicates with the central control via the first and second optical fiber transmitter/receivers.

12. The method of claim 11, wherein the fiber optic ring comprises a duplex fiber optic ring, and wherein in the event of an outage in a fiber optic link of the fiber optic ring, the central control communicates with the one or more contactors in each of the plurality of bypass devices via the remaining plurality of fiber optic links of the fiber optic ring.

13. The method of claim 11, further comprising:

determining, by an arm position sensing module of the contactor, a state of the contactor, and communicating, by the controller, the state of the contactor determined by the arm position sensing module to the central control via at least one of the first and second optical fiber transmitter/receivers.

14. The method of claim 13, wherein the state of the contactor corresponds to one of a full bypass and a partial bypass of the power cell in which the contactor is located.

15. The method of claim 11, further comprising, based on a power-up of the multi-cell power supply:

interrogating, by the central control, the one or more contactors in the respective bypass device of each of the plurality of power cells for state information via the fiber optic ring; and receiving, by the central control, the state information in response to the interrogation from the one or more contactors in the respective bypass device of each of the plurality of power cells via the fiber optic ring.

16. The method of claim 15, wherein the central control comprises a memory, and further comprising:

storing, by the central control, state information for each of the one or more contactors in the respective bypass device of each of the plurality of power cells in the memory; and based on receiving the state information in response to the interrogation from the one or more contactors in the respective bypass device of each of the plurality of power cells via the fiber optic ring, comparing, by the central control, the received state information to the stored state information.

17. The method of claim 11, further comprising:

detecting a failure in a power cell of the plurality of power cells by the central control; and based on detection of the failure of the power cell, sending a bypass command from the central control to one or more contactors in the bypass device of the failed power cell via the fiber optic ring; and storing state information corresponding to the bypass command for the one or more contactors in the bypass device of the failed power cell in the memory by the central control.

18. The method of claim 17, wherein the bypass command corresponds to one of a full bypass of the failed power cell and a partial bypass of the failed power cell.

* * * * *